July 20, 1948.  G. W. BARLOW  2,445,383
SCREW DRIVER HAVING TWO PART EXPANDING BIT
Filed July 11, 1944  2 Sheets-Sheet 1
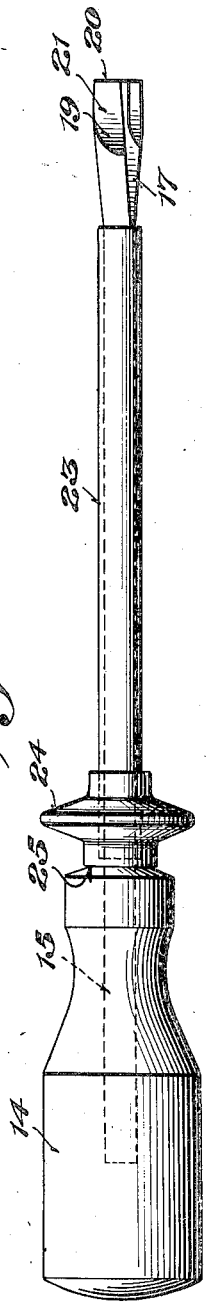
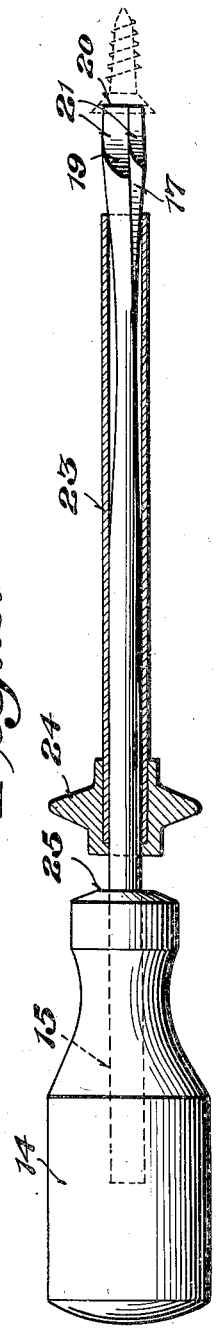
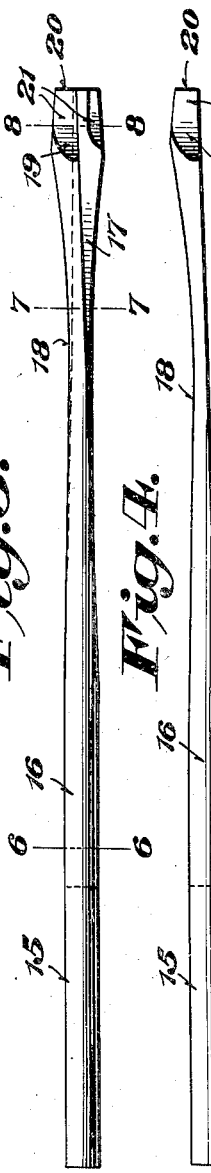
Inventor
George W. Barlow,
By Royal E. Burnham,
Attorney July 20, 1948. G. W. BARLOW 2,445,383
SCREW DRIVER HAVING TWO PART EXPANDING BIT
Filed July 11, 1944 2 Sheets—Sheet 2
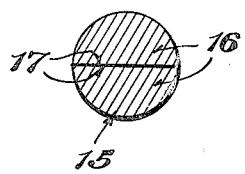
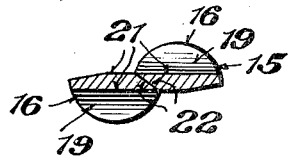
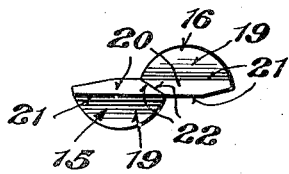
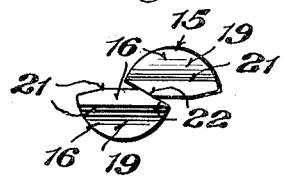
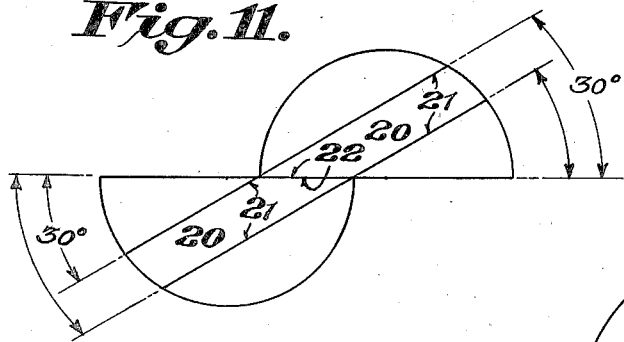
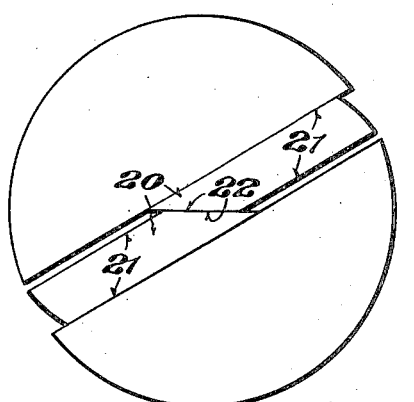
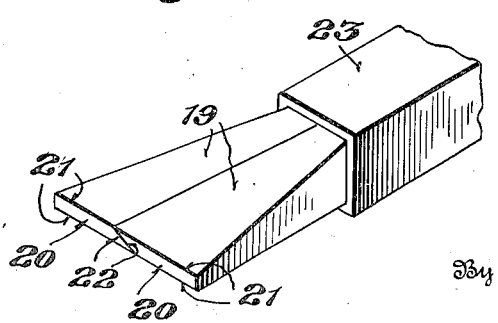
Inventor
George W. Barlow,
By Royal E. Burnham,
Attorney Patented July 20, 1948

2,445,383

UNITED STATES PATENT OFFICE 2,445,383

SCREW DRIVER HAVING TWO-PART EXPANDING BIT

George Walker Barlow, Salt Lake City, Utah

Application July 11, 1944, Serial No. 544,358

1 Claim. (Cl. 145—50)

This invention provides a screw driver so formed that its parts engaging in the slot or kerf of a screw head may be caused to engage the slot or kerf walls, whereby the screw is held on the tool while being positioned for driving.

The tool of the invention is especially useful for positioning and driving home screws at places that cannot be reached by a hand, and for removing screws from such places.

It is an object of the invention so to form the tool in its screw engaging tip that, with only slight movement of two tip parts, the parts will quickly move relatively transversely to engage against the screw slot or kerf walls and securely hold the screw on the tool until intentionally released, and this without materially diminishing the length of the slot or groove engaging tip even when the slot is abnormally wide.

Another object is to provide a tool of this kind with two mutually cooperable movable parts forming its tip, and which parts do not overlap each other and have substantially parallel sides that normally are disposed in the same planes, whereby the normally aligned parts present the maximum thickness of metal in the tip and thick enough to sustain much torque in the driving and removal of screws.

When considered with the description herein, characteristics of the invention are apparent in the accompanying drawing, forming part hereof, wherein an adaptation of the invention is disclosed for purposes of explanation.

Like reference-characters refer to corresponding parts in the views of the drawing, of which—

Fig. 1 is a plan view of my screw driver;

Fig. 2 is a similar view, with the control sleeve shown in section;

Fig. 3 is a view of one form of shaft without the sleeve;

Fig. 4 is an outside view of one of the legs thereof;

Fig. 5 is a view showing the inner side of a leg;

Fig. 6 is a section on line 6—6, Fig. 3;

Fig. 7 is a section on line 7—7, Fig. 3;

Fig. 8 is a section on line 8—8, Fig. 3;

Fig. 9 is a view of the shaft tip end as seen with parts as in Figs. 1 and 3;

Fig. 10 is a similar view as seen with parts as in Fig. 2;

Fig. 11 is an enlarged view illustrative of an angle at which abutting edges of tip portions may be disposed;

Fig. 12 is an enlarged view illustrative of tip parts expanded against walls of a screw slot;

Fig. 13 is a view illustrative of legs of non-circular cross-section and of the tip formation thereof.

My screw driver may include a handle 14. It has a metal shaft 15, with one end portion formed to be firmly fixed in the handle or to be received by the chuck of a brace or other holding device. The shaft for ordinary use in a handle usually is circular in cross-section, but may be rectangular or polygonal in cross-section if desired.

The shaft, preferably of spring steel, is bifurcated and has substantially identical legs 16, and may be produced in any suitable manner, as by taking, for the circular cross-section form, equal lengths of half-round rod stock having polished or smooth diametrical flat sides 17, which abut when assembled. Two such pieces, aligned with their flat sides abutting, are welded together in the end parts to afford a solid shaft portion to be fixed in a handle, chuck, or the like.

The legs, as thus assembled, may extend straight from the holding end portion to a point in their length relatively near their free ends and from that point each leg be deflected outwardly in the plane of its diametrical surface and in opposite directions as shown. Or, if desired, the legs may deflect outwardly from that point at which the rod is welded to form a handle or chuck engaging portion.

Each finger is ground on the outside, as indicated by 19, to taper to a screw-slot or kerf engaging tip 20 at the free end. This formation is such as to give the tip of each finger substantially parallel sides 21, so that both of them are of substantially the same thickness from end to end and to leave a relatively thick and strong tip.

Adjacent end edges of the finger tips, which at that place are side edges of the fingers, abut truly. They are ground to afford coincident angular or beveled surfaces 22 disposed in a rather large acute angle say from 30° to 45° with respect to the tip sides 21. Normally the sides 21 of the two tip parts lie in two substantially parallel planes; that is, the two tips normally are in alignment, as seen in Fig. 11. Thus the sides of the tip parts are parallel to the plane of the axis of the tip between the sides. This axis is referred to as the lineal axis of the tip parts.

An elongated control sleeve 23 envelopes the shaft 15 and extends over portions of the fingers. The sleeve is movable longitudinally on the shaft, and it may have an annular projecting finger piece 24, whereby it may be shifted.

The sleeve is of such length and other parts are so formed, proportioned, and coordinated that, when one end of the sleeve is in contact with a fixed stop 25, such as may be afforded, for example, by an end of the handle 14, the other end portion extends over enough of the outwardly deflected fingers to confine the tips thereof in the normal position before referred to; that is, the tip ends are in alignment. This is the position of the sleeve as seen in Fig. 1 and of the tip as seen in Figs. 9, 11, and 13. Then the end of the screw-slot engaging tip appears substantially the same as that of a conventional screw driver, a difference then visible being the line made by the abutting surfaces 22. The tip parts being in normal relation to each other, the tip as a whole is ready for insertion into a screw slot or kerf. The outward spring urge of the fingers against the sleeve is sufficient to hold the latter in position and to prevent its accidental displacement therefrom.

The angular edges 22, which are on abutting sides of end portions of the fingers and perpendicular to the tip edge or end, are referred to herein as inner edges or surfaces, or confronting walls, to distinguish them from the sides 21 of the tip that engage against the walls of a screw slot or kerf. Viewing the tip end as seen in Figs. 9, 10, 11, and 12, the edges 22 are at ends of the tip terminal parts.

When it is desired to have a screw held on the tip end of the tool, the screw is held by one hand, and the tool, with its parts in normal position, is held by the other hand. The tip is inserted in the screw slot, and then the sleeve is shifted toward the tip by fingers of the hand that grasps the handle. This causes the outwardly urged fingers to be contracted or more inwardly linearly of the kerf, with the result that the angularly disposed coacting surfaces 22 cause the tip ends of the legs to be offset or move transversely in opposite directions into engagement with the walls of the slot or kerf and thus hold the screw on the end of the tool. The tips then are in position shown by Figs. 10 and 12.

Only slight movement of the sleeve is required to cause holding action of the tip parts. Because of this, the sleeve may be quite long and extend normally from the handle over the major portion of the shaft. Consequently, the sleeve holds the major length of the legs closely together and gives a reenforced tool shaft.

With a screw held as stated, it can be positioned in an out-of-the-way place that cannot be reached by a hand, and then turned in.

When the tool is to be released from a screw, either after initial turning in or at completion of the driving, the sleeve is shifted along the shaft back to its normal place and the shaft fingers spring back toward normal position and thereby discontinue holding action of the tip in the screw slot.

A screw can be removed by placing the tool tip in the screw slot or kerf and turning the screw out, the sleeve being shifted to expand the coacting finger tips against the slot or kerf walls before the screw is ready to be lifted out.

A feature of prime importance is that the tip sides 21 normally are substantially parallel and thus are not tapered to slide one against the other. Consequently, the tips of the fingers are of the same thickness from end to end with but a small bevelled portion at the inner or abutting edges thereof and are adequately capable of sustaining the torque incident to turning a screw encountering great resistance to rotation.

Expansion of parts of the tip of the tool to effect the holding of a screw thereon is caused only by coaction of the angularly disposed inner edges or contacting walls 22 when the two fingers of the shaft are pressed toward each other by the sleeve. These surfaces are disposed in a rather large acute angle with respect to sides of the tip, with the result that comparatively little relative inward movement of the finger tips is required to force the tip sides against walls of a screw slot. Therefore, the tips are capable of quick lateral expansion in a screw slot or groove to the maximum extent, and this without materially diminishing the length of the tip. This is particularly desirable when using the tool with screws having unusually wide slots. In fact, with the construction herein disclosed, the tip ends may be offset or moved relatively transversely to the maximum extent by moving the legs edgewise toward each other less than half the length of one of the tip ends.

I have found in practice that usually the greatest satisfactory, workable, and effective angle in which the coacting end surfaces of the tip portion of the tool may be disposed in one of, say, 45 degrees or thereabout, but in some circumstances a greater angle may be suitable. While the greater the angle, the quicker is lateral expansion with lineal contraction of the tips, more effort is required to cause lateral expansion with a larger angle than with a smaller one, when the lineal contraction is the same. Of course, the size and the strength, and the purposes for which a screw driver is intended, are factors in determining the angle.

In screw drivers for conventional use by machinists, mechanics, carpenters, and the like, and in the household, I have found that an angle of 30 degrees, as seen in Fig. 12 and illustrated geometrically by Fig. 11, or one slightly different, is suitable and effective for quick expansion of the tips against and their release from walls of screw slots.

With the coacting finger tip surfaces disposed in a comparatively large acute angle, there is less tendency of those accurately machined surfaces to cohere as a result of pressure to expand the tips laterally. Consequently, less spring-back effort is required to restore the tips to normal position upon shift of the sleeve to normal place.

Adhesion of those surfaces may occur as a result of rust, dirt, gum, or other matters between them. It is of importance that lineal urge of the fingers to spring back to normal position shall be able to overcome adhesion in the coacting surfaces 22, and especially so for those requiring tools that always are ready, and with small and frail screw drivers such as used by horologers, opticians, and the like.

Another excellent characteristic of my screw driver is that, for some purposes, it must have a tip end of limited length and yet be capable of the transverse expansion necessary to hold a screw without making the tip too short; for example:

Some screws have rather short slots with closed ends in their heads. For such screws, the tip of a driver cannot be longer than the slot. With my driver tip thus limited, it, nevertheless, can be offset or expanded transversely in the slot without appreciably diminishing its length and making it shorter than required for turning a screw.

A similar situation exists with screw heads countersunk or located in holes of practically the same diameter as the heads. A driver tip, to reach a screw so located, cannot be larger than the hole. The tip of my driver need not be longer than the diameter of the hole, and it may be expanded transversely, with little diminution of its length, to lock in the screw slot and drive the screw home or lift it out after it has been loosened.

I claim:

A screw driver of the character described, including a metallic shank having one end thereof split to provide a pair of resilient normally separated legs, each of said legs having on the free end thereof a kerf engaging tip part of a width less than the width of the kerf, means for maintaining the legs in substantially the same plane for easy insertion into the kerf of a screw head, the kerf engaging end of each of said tip parts being substantially trapezoidal in cross-section to provide each of the tip parts with a pair of parallel kerf wall engaging sides and a pair of confronting contacting walls, the said confronting walls of the tip parts being oppositely beveled so as to cause said tip parts to move transversely with respect to each other toward opposite sides of the kerf when force is applied to urge the tip parts toward each other and linearly of the kerf, the transverse length of the effective surface forming each of the beveled confronting and contacting walls of the tip parts being less than one-half of the length of the kerf engaging side of either of said tip parts whereby when the tip parts are in a position that the confronting faces completely overlap, the thickness of the tip along its kerf engaging length is substantially uniform throughout the combined kerf engaging length of the tip parts and movement of the tip parts toward each other linearly of the kerf a distance less than one-half the kerf engaging length of either of the tip parts produces maximum relative transverse movement of the tip parts toward engagement with the kerf sides, movement of said first mentioned means toward the kerf engaging end forcing the tip parts toward each other and linearly of the kerf.

GEORGE WALKER BARLOW.

REFERENCES CITED

The following references are of record in the file of this patent:

UNITED STATES PATENTS

| Number | Name | Date |
|---|---|---|
| 39,206 | Ayres | July 14, 1863 |
| 1,275,810 | White | Aug. 13, 1918 |
| 1,699,306 | Millen | Jan. 15, 1929 |

FOREIGN PATENTS

| Number | Country | Date |
|---|---|---|
| 359,716 | Great Britain | Oct. 29, 1931 |

Certificate of Correction

Patent No. 2,445,383.

July 20, 1948.

GEORGE WALKER BARLOW

It is hereby certified that error appears in the printed specification of the above numbered patent requiring correction as follows: Column 3, line 37, for the word "more" read *move*; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*